Feb. 28, 1967   A. WOOLER   3,306,036
POWER PLANT
Filed March 22, 1965
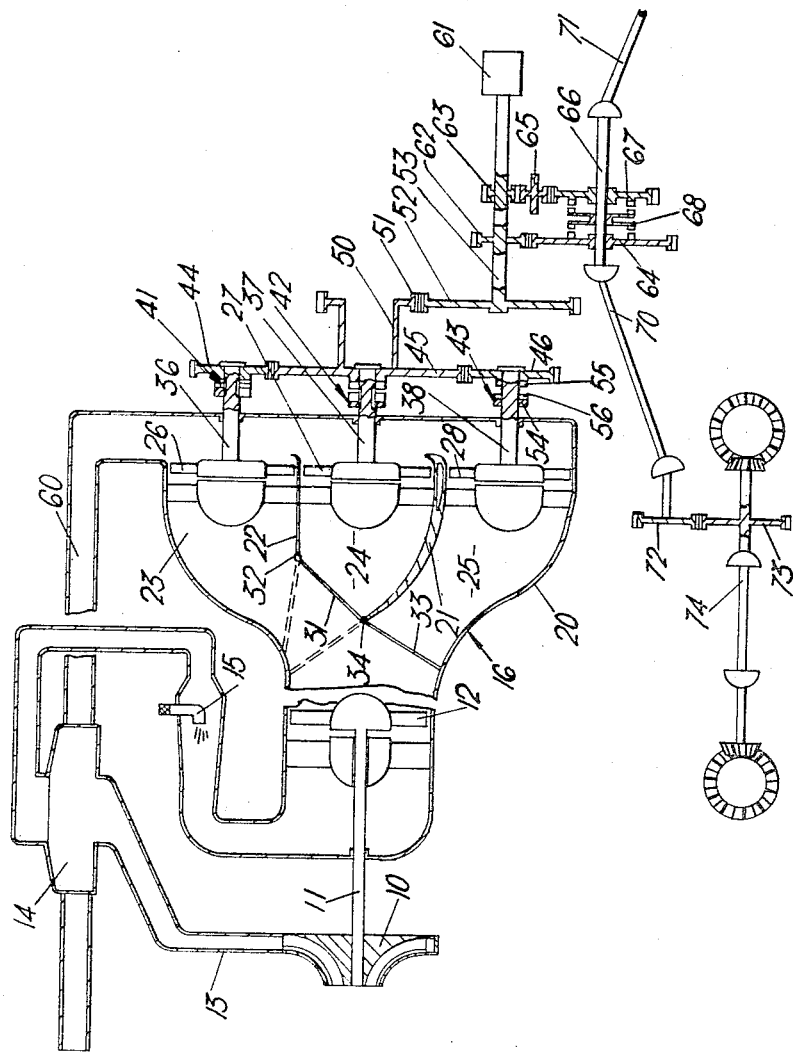

United States Patent Office 3,306,036
Patented Feb. 28, 1967

3,306,036
POWER PLANT
Anthony Wooler, Derby, England, assignor to Rolls-Royce Limited, Derby, England, a British company
Filed Mar. 22, 1965, Ser. No. 441,511
Claims priority, application Great Britain, Apr. 13, 1964, 15,257/64
5 Claims. (Cl. 60—39.16)

This invention concerns power plant.

Where a power plant is adapted to develop more than 2000 H.P., it is difficult to provide the power plant with a synchro-mesh gear box.

According therefore to the present invention, there is provided power plant comprising a plurality of input shafts which are drivingly connected by gearing to a common output shaft, a plurality of power turbines each of which drives a said input shaft, a gas generator, and ducting provided with valve means for directing gas from the gas generator through a selected one or more of said power turbines so as to drive the latter, the said gearing being such that a gear change is effected by moving said valve means so as to drive a different power turbine or turbines.

Preferably, each input shaft is connected to a respective gear of said gearing by means of a clutch device, engagement of which occurs only when the rotational speed of the input shaft is at least as great as that of the said respective gear.

In this case each power turbine will be driven only by the gas from the gas generator, and will not be driven at all when the valve means is in a position such as to prevent gas from the gas generator reaching it.

Preferably, the valve means, in the course of being moved between two different positions so as to change the power turbine or turbines which are being driven, permits some gas to flow to each of said power turbines.

This enables a power turbine which is to be brought into operation to be run up to synchronising speed before being connected to its respective gear.

Preferably, there is a drive shaft, and forward and reverse gearing for effecting a drive connection between the said drive shaft and the said output shaft.

The gas generator preferably comprises a compressor, a path through a heat exchanger, combustion equipment, and a compressor turbine, all arranged in flow series, the gases which have passed through the power turbines being directed by conduit means to flow through another path through said heat exchanger.

If desired, the output shaft may be provided with a hydro-dynamic brake.

The invention also comprises a locomotive provided with power plant as set forth above.

The invention is illustrated, merely by way of example, in the accompanying drawing, which is a sectional view of a power plant according to the present invention.

Referring to the drawing, a locomotive power plant comprises a gas generator comprising centrifugal compressor 10 which is mounted on a shaft 11 driven by a compressor turbine 12. Air which has been compressed by the centrifugal compressor 10 passes to the compressor turbine 12 by way of a duct 13 which incorporates a path through a heat exchanger 14. Combustion equipment 15 is mounted in the duct 13 downstream of the heat exchanger 14.

The turbine exhaust gases from the compressor turbine 12 flow through ducting 16 having an outer wall 20 and two internal walls 21, 22. The walls 21, 22, serve to divide the ducting 16 into three compartments 23, 24, 25, in the downstream end of each of which is mounted a power turbine 26, 27, 28, respectively.

A flap valve 31 is pivotally mounted at a point 32 on the wall 22. The flap valve 31 may be moved between a position, indicated in full lines, in which it contacts the wall 21, and a position, indicated by dotted lines, in which it contacts the outer wall 20. In the full line position, exhaust gases from the compressor turbine 12 may pass through the power turbine 26 but not through the power turbine 27, whereas when the flap valve 31 is in the dotted line position, exhaust gases from the compressor turbine 12 may pass through the power turbine 27 but not through the power turbine 26.

A flap valve 33 is pivotally mounted at a point 34 on the wall 21. The flap valve 33 may be moved between a position, shown in full lines, in which it contacts a point on the outer wall 20, and a position, indicated in dotted lines, in which it contacts a diametrically opposite point on the outer wall 20. When the flap valve 33 is in the full line position, exhaust gases from the compressor turbine 12 cannot pass into the compartment 25 so as to drive the power turbine 28, although these exhaust gases may at this time flow through either the power turbine 26 or the power turbine 27, according to the position of the flap valve 31. When the flap valve 33 is in the dotted line position, however, no exhaust gases from the compressor turbine 12 may pass through the power turbines 26, 27, the said exhaust gases being directed at this time through the power turbine 28.

The power turbines 26, 27 and 28, are respectively mounted on input shafts 36, 37, 38. The input shafts 36, 37, 38 are respectively connected by clutch devices 41, 42, 43, to gears 44, 45, 46 respectively. The gear 45 is disposed centrally between the gears 44, 46, the gears 44, 46 meshing with diametrically opposite points on the gear 45. The gear 44 has fewer teeth than the gear 46, whilst the gear 45 has substantially more teeth than either of the gears 44, 46.

The gear 45 is mounted on a shaft 50 which is provided with a gear 51, the latter having fewer teeth than the gear 45. The gear 51 meshes with a larger gear 52 on an output shaft 53.

It will thus be appreciated that when the flap valves 31, 33 are in their full line positions in each case, there is a low gear drive to the output shaft 53 by way of the power turbine 26 and the gears 44, 45, 51, 52. When, however, the flap valve 33 is in its dotted line position, there is an intermediate gear drive to the output shaft 53 by way of the power turbine 28 and the gears 46, 45, 51, 52. Finally, when the flap valve 33 is in its full line position, while the flap member 31 is in its dotted line position, there is a top gear drive to the output shaft 53 via the power turbine 27 and the gears 45, 51, 52.

Thus a gear change is effected, merely by moving the flap valves 31, 33, so as to drive a selected one of the power turbines 26, 27, 28.

Each of the clutch devices 41, 42, 43, comprises a member 54 which is helically splined onto the respective input shaft 36, 37 or 38. The said input shafts are rotatably mounted within their respective gears 44, 45, 46, the latter being provided with dog teeth 55 which are engageable with dog teeth 56 on the member 54. The arrangement is such that when the rotational speed of one of the input shafts 36, 37, 38, is at least as great as that of its respective gear 44, 45, 46, the member 54 travels up the helical splines so as to bring the dog teeth 55, 56 into engagement. At other times, however, these dog teeth are out of engagement. As a result, each of the turbines 26, 27, 28, will only be driven by gases from the compressor turbine 12 and will not be driven by one of the other power turbines through the gears 44, 45, 46.

When the power plant is first started, the flap valves 31, 33 are in their full line positions, whereby the turbine exhaust gases from the compressor turbine 12 are directed through the power turbine 26 only. A low gear drive to he output shaft 53 is thus effected. When the power turbine 26 has reached its maximum speed, the power turbines 27, 28 being stationary at this time, the flap valve 33 is gradually moved from the full line to the dotted line position. During this movement, turbine exhaust gases from the compressor turbine 12 will flow through both the power turbines 26, 28, whereby the power turbine 28 will be brought up to its synchronising speed.

When the power turbine 28 is at synchronising speed, the dog teeth 55, 56 of the clutch device 43 will be engaged, and the flap valve 33 will have been moved into its dotted line position. An intermediate gear drive to the output shaft 53 will thus have been obtained.

The flap valve 31 is then moved into its dotted line position, in preparation for the next change of gear. The flap valve 33 is then moved from its dotted line position towards its full line position, and in the course of this movement, turbine exhaust gases from the compressor turbine 12 will flow through both the power turbines 27, 28, whereby the power turbine 27 will be brought up to synchronising speed.

When the power turbine 27 is at synchronising speed and the clutch device 42 will thus be engaged, the flap member 33 is moved to its full line position, whereby the turbine exhaust gases from the compressor turbine 12 pass exclusively through the power turbine 27, whereby to effect a high gear drive to the output shaft 53.

The gases which have passed through the power turbines 26, 27, 28, are directed by a conduit 60 to flow through another path through the heat exchanger 14, so as to be in heat exchange with the compressed air from the centrifugal compressor 10.

The output shaft 53, which is provided with a hydrodynamic brake 61, is also provided with gears 62, 63.

The gear 62 meshes with a gear 64 which is freely mounted on a drive shaft 66, while the gear 63 meshes with a gear 65 meshing with a gear 67 which is freely mounted on the drive shaft 66. The drive shaft 66 is provided with a dog clutch 68 which may be selectively engaged, on axial movement in one direction or the other, with either the gear 64 or the gear 67. When the dog clutch 68 is engaged with the gear 64, a reverse gear is selected, whereas when the dog clutch 68 is engaged with the gear 67, a forward gear is selected.

Means, not shown are provided for effecting the necessary axial movement of the drive shaft 66.

The drive shaft 66 drives, via transmissions 70, 71, a pair of gears 72, of which only one is shown. Each of the gears 72 meshes with a gear 73, on an axle 74 of a locomotive (not shown).

I claim:
1. Power plant comprising a plurality of turbine driven drive input shafts, a common output shaft, a plurality of input gears and a plurality of one-way clutch devices connected between respective said input shafts and respective said input gears, an output gear mounted on the output shaft and connecting with each respective input gear in a different respective gear ratio, a plurality of power turbines each of which is drivingly connected to a respective said input shaft, a gas generator, ducting connected to the gas generator to receive gas therefrom, valve means having different respective positions in said ducting for directing gas from the gas generator through different respective power turbines and means for moving said valve means between said different respective positions to effect changes in the respective gear ratio in which power is transmitted to the output shaft.

2. Power plant as claimed in claim 1 in which the valve means, in the course of being moved between two different respective positions in which the gas from the gas generator is directed through two different respective turbines, permits some gas to flow through each of said two power turbines.

3. Power plant as claimed in claim 1 including a drive shaft and forward and reverse gearing for selectively effecting a drive connection between the said drive shaft and the said output shaft.

4. Power plant as claimed in claim 1 in which the gas generator comprises a compressor, a first gas flow duct, combustion equipment and a compressor-driving turbine, all arranged in flow series, and a second gas flow duct arranged in heat exchange relationship with said first gas flow duct and adapted to receive gases which have passed through the power turbines.

5. Power plant as claimed in claim 1 and further comprising a hydrodynamic brake for the output shaft.

References Cited by the Examiner

UNITED STATES PATENTS

| | | | |
|---|---|---|---|
| 945,933 | 1/1910 | Geisenhoner | 60—102 |
| 2,625,006 | 1/1953 | Lundquist | 60—39.16 X |
| 2,906,092 | 9/1959 | Haltenberger | 60—39.16 |
| 3,079,126 | 2/1963 | Pohl. | |

JULIUS E. WEST, *Primary Examiner.*